(12) United States Patent
George et al.

(10) Patent No.: US 6,171,685 B1
(45) Date of Patent: Jan. 9, 2001

(54) WATER-DISPERSIBLE FILMS AND FIBERS BASED ON SULFOPOLYESTERS

(75) Inventors: Scott Ellery George; Richard Anthony Miller; Jimmy Ray Trotter, all of Kingsport; Jayne Webb Lettich, Gray; Sammy Ray Repass, Jonesborough, all of TN (US)

(73) Assignee: Eastman Chemical Company, Kingsport, TN (US)

( * ) Notice: Under 35 U.S.C. 154(b), the term of this patent shall be extended for 0 days.

(21) Appl. No.: 09/450,285

(22) Filed: Nov. 26, 1999

(51) Int. Cl.⁷ .............................. B32B 7/02; D02G 3/00; C08F 20/00
(52) U.S. Cl. .................... 428/221; 528/288; 528/289; 528/291; 528/294; 528/295; 528/302; 528/308; 528/308.6; 525/437; 525/444; 524/401; 524/413; 524/424; 524/425; 524/432; 524/433; 524/436; 524/445; 524/450; 524/451; 428/364
(58) Field of Search ................................... 528/288, 289, 528/291, 294, 295, 302, 308, 308.6; 525/437, 444; 524/401, 413, 424, 425, 432, 433, 436, 445, 450, 451; 428/221, 364

(56) References Cited

U.S. PATENT DOCUMENTS

| 3,018,272 | 1/1962 | Griffing et al. . | |
|---|---|---|---|
| 3,033,822 | 5/1962 | Kibler et al. . | |
| 3,075,952 | 1/1963 | Coover et al. . | |
| 3,734,874 | 5/1973 | Kibler et al. . | |
| 3,779,993 | 12/1973 | Kibler et al. . | |
| 4,304,901 | 12/1981 | O'Neill et al. . | |
| 4,704,309 | * 11/1987 | Coney et al. ........................ | 427/258 |
| 4,940,744 | 7/1990 | Tortorici et al. . | |
| 5,290,631 | 3/1994 | Fleury et al. . | |
| 5,543,488 | 8/1996 | Miller et al. . | |
| 5,552,495 | 9/1996 | Miller et al. . | |
| 5,552,511 | 9/1996 | Miller et al. . | |
| 5,571,876 | 11/1996 | Miller et al. . | |
| 5,605,764 | 2/1997 | Miller et al. . | |

FOREIGN PATENT DOCUMENTS

WO99/18269  4/1999  (WO) .

* cited by examiner

*Primary Examiner*—Samuel A. Acquah
(74) *Attorney, Agent, or Firm*—Jonathan D. Wood; Bernard J. Graves, Jr.; Harry J. Gwinnell

(57) ABSTRACT

Provided are water-dispersible sulfopolyester compositions having relatively large proportions of pigments and/or fillers. Such compositions are useful as packaging materials and are substantially non-blocking when processed using packaging rolls and are comprised of at least one sulfopolyester as described herein, about 10 to about 75 weight percent of a pigment and/or filler, and a wax.

12 Claims, No Drawings

WATER-DISPERSIBLE FILMS AND FIBERS BASED ON SULFOPOLYESTERS

FIELD OF THE INVENTION

This invention relates to water-dispersible film and fiber compositions that are based on formulations containing sulfopolyesters. The formulations may be manufactured in-situ directly after the polymer is synthesized and fabricated into films by melt extrusion. Excellent quality films are obtained that maintain water-dispersibility and non-blocking characteristics.

BACKGROUND OF THE INVENTION

Water soluble or water-dispersible films are known, but there are few commercially viable examples. Polyvinyl alcohol (PVOH) film constitutes nearly all of the volume and is used for disposable bags and packaging. A solution process is typically employed for PVOH since it lacks thermal stability. This is cumbersome and adds to the cost of the manufactured film.

Sulfopolyesters are another class of materials where cast films may subsequently be re-dispersed into water. Typical sulfopolyesters, such as those disclosed in U.S. Pat. No. 3,734,874, result in brittle films or films having low strength.

More recently, a family of branched sulfopolyesters has been developed for water-dispersible adhesive formulations as disclosed in U.S. Pat. Nos. 5,543,488; 5,552,495; 5,552,511; 5,571,876; and 5,605,764. These polymers are easily dispersible into water, but have glass transition (Tg) values not greater than 20° C. and result in films that undergo blocking during storage.

SUMMARY OF THE INVENTION

The present invention provides a water-dispersible sulfopolyester composition having relatively large proportions of pigments and/or fillers. Such compositions are substantially non-blocking when processed using packaging rolls and are comprised of at least one sulfopolyester as described herein; about 10 to about 75 weight percent of a filler; and one or more waxes.

DETAILED DESCRIPTION OF THE INVENTION

The present invention provides a water-dispersible polymer composition comprising
(a) at least one sulfopolyester as described herein;
(b) about 10 to 75 weight percent of a pigment or filler; and
(c) a wax; with the sum of (a), (b), and (c) equaling 100 weight percent.

The sulfopolyester material may be linear or branched. In a preferred embodiment, the sulfopolyester is comprised of
(i) monomer residues of at least one dicarboxylic acid; and
(ii) about 4 to 25 mole percent, based on the total of all acid and hydroxy equivalents, of monomer residues of at least one difunctional sulfomonomer containing at least one sulfonate group bonded to an aromatic ring, wherein the functional groups are hydroxy or carboxyl; and optionally
(iii) monomer residues of at least one poly(alkylene glycol) having the formula —(OCH$_2$CH$_2$)$_n$— wherein n is 2 to about 500, provided that the mole percent of such residues is inversely proportional to the value of n; and
(iv) up to about 75 mole percent of monomer residues of at least one diol, wherein said diol is other than a poly(alkylene glycol).

In a further preferred embodiment, the sulfopolyester component (i) is a blend of two or more sulfopolyesters. Particularly preferred polyesters are the substantially linear polyesters described in U.S. Pat. No. 3,779,993, and the branched polyesters described in U.S. Pat. No. 5,543,488, incorporated herein by reference.

Thus, the present invention further provides a water-dispersible polymer composition comprising
(I) a sulfopolyester component comprising
  (a) a water-dispersible sulfopolyester having a Tg of ≦20° C. comprised of residues of
    (i) at least one difunctional dicarboxylic acid;
    (ii) at least one difunctional glycol containing two —CH$_2$OH groups of which at least 15 mole percent is a poly(ethylene glycol) having the formula

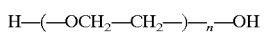
    H—(—OCH$_2$—CH$_2$—)$_n$—OH wherein n is an integer in the range of 2 to about 20;
    (iii) in an amount to provide said water dispersible characteristic of said polymer of at least one difunctional sulfomonomer containing at least one metal sulfonate group to an aromatic nucleus wherein the functional groups are hydroxy or carboxy; and
    (iv) up to about 50 mole percent of a difunctional hydroxy-carboxylic acid having one —C(R)$_2$—OH group, wherein R is H or a C$_1$–C$_4$ alkyl group; and
  (b) a water-dispersible branched polyester composition comprised of residues of:
    (I) at least one difunctional dicarboxylic acid which is not a sulfomonomer;
    (II) about 2 to 30 mol percent, based on the total of all acid, hydroxyl and amino equivalence, of residues of at least one difunctional sulfomonomer containing at least one sulfonate group bonded to an aromatic ring wherein the functional groups are hydroxyl, carboxyl, or amino;
    (III) at least one diol or a mixture of a diol and a diamine comprising:
      (A) about 0.1 to 85 mole percent, based on the total mol percent of diol moieties or diol and diamine moieties, of a diol or diamine having the formula H(—OCH$_2$CH$_2$—)$_n$OH and HRN(—(CH$_2$CH$_2$O))$_n$NHR wherein n is 2 to about 20 and R is hydrogen or C$_1$–C$_6$ alkyl provided that the mole percent of such moieties is inversely proportional to the value of n;
      (B) about 0.1 to 15 mol percent, based on the total mol percent of diol moieties or diol and diamine moieties, of moieties of a poly(ethylene glycol) having the formula H(—OCH$_2$CH$_2$—)$_n$OH wherein n is 2 to about 500, provided that the mol percent of such moieties is inversely proportional to the value of n; and
      (C) 0 to greater than about 99 mol percent of the diol component or diol and diamine mixture being selected from the group consisting of a glycol and a mixture of glycol and diamine having two —NRH groups, the glycol containing two —C(R$^1$)$_2$—OH groups wherein R$^1$ is a hydrogen atom, an alkyl of 1 to 5 carbon atoms, or an aryl group of 6 to 10 carbon atoms;

(IV) 0 to about 40 mol % of a difunctional monomer reactant selected from the group consisting of hydroxycarboxylic acids having one —C(R—)$_2$—OH group, aminocarboxylic acids having one —NRH group, aminoalkanols having one —C(R—)$_2$OH group and one —NRH group and mixtures of said difunctional reactants wherein R is hydrogen or an alkyl group of 1 to 6 carbon atoms; and (V) about 0.1 to 40 mol % of a multifunctional or branch-inducing reactant containing at least three functional groups selected from hydroxyl, carboxyl, amino, and mixtures thereof;

said branched polyester comprised of substantially equal mole proportions of acid equivalents (100 mol %) and diol or diol and diamine equivalents (100 mol %) wherein at least 20 weight percent of the groups linking the moieties of the monomeric units are ester linkages and wherein the inherent viscosity is at least 0.1 dL/g measured in a 60/40 parts by weight solution of phenol/tetrachloroethane at 25° C. and at a concentration of about 0.25 g of polymer in 100 ml of the solvent, the glass transition temperature $T_g$ is no greater than 20° C., and the ring and ball softening point is at least 70° C.;

(II) about 10 to 75 weight percent of a pigment or filler; and (III) a wax.

As noted above, the sulfopolyester may be a linear or branched material. It is particularly preferred to blend two or more sulfopolyesters insofar as this approach provides a balance of properties. Particular utility is obtained from blends of a low Tg branched sulfopolyester, such as Eastman AQ® 14000 resin, with a higher Tg linear sulfopolyester, such as Eastman AQ® 55 resin.

In this regard, a particularly preferred branched sulfopolyester is comprised of (i) a dicarboxylic acid;

(ii) 2 to 15 mole percent of sodioisophthalic acid residues;

(iii) poly(ethylene glycol);

(iv) up to 50 mole percent of a diol which is other than poly(ethylene glycol);

(v) 0.1 to 20 mole percent of at least one trifunctional hydroxy compound; wherein said sulfopolyester has a $T_g$ of $\leq 20°$ C.

A particularly preferred linear sulfopolyester is comprised of (i) an aromatic diacid component comprised of up to 50 mole percent of an aliphatic or cycloaliphatic diacid;

(ii) 5 to 25 mole percent of sodioisophthalic acid;

(iii) a diol;

(iv) up to 75 mole percent of poly(ethylene glycol); wherein said sulfopolyester has a $T_g$ of about 25 to 125° C.

The term "water-dispersible" is often used interchangeably with other descriptors such as "water-dissipatable", "water-soluble", or "water-dispellable". In the context of this invention, all of these terms refer to the activity of water or a mixture of water and a water-miscible cosolvent on the polyesters described herein. Examples of such water-miscible cosolvents includes alcohols, ketones, glycol ethers, esters and the like, typically used in waterborne coating compositions. It is intended for this terminology to include conditions where the polyester is dissolved to form a true solution as well as those where the polyester is dispersed within the aqueous medium to obtain a stable product. Often, due to the statistical nature of polyester compositions, it is possible to have a soluble fraction and a dispersed fraction when a single polyester sample is placed in an aqueous medium.

The polyesters of the present invention contain substantially equal molar proportions of acid equivalents (100 mol %) and hydroxyl equivalents (100 mol %) such that the total of acid and hydroxyl equivalents is equal to 200 mol %.

The water-dispersible polyesters described herein have an inherent viscosity of at least about 0.1 dL/g, preferably about 0.2 to 0.3 dL/g, and most preferably greater than about 0.3 dL g, measured in a 60/40 parts by weight solution of phenol/tetrachloroethane solvent at 25° C. and at a concentration of about 0.25 g of copolyester in 100 mL of solvent.

Examples of suitable dicarboxylic acid comonomers that may be used include aliphatic diacids, alicyclic dicarboxylic acids, aromatic dicarboxylic acids, or mixtures of two or more of these acids. Although not limiting, suitable dicarboxylic acids include succinic; glutaric; adipic; azelaic; sebacic; fumaric; maleic; itaconic; 1,3-cyclohexane dicarboxlic; 1,4-cyclohexanedicarboxylic; diglycolic; 2,5-norbornanedicarboxylic; phthalic; terephthalic; 1,4-naphthalenedicarboxylic; 2,5-naphthalenedicarboxylic; 2,6-5 naphthalenedicarboxylic; 2,7- naphthalenedicarboxylic; diphenic; 4,4'-oxydibenzoic; 4,4'-sulfonyidibenzoic; and isophthalic. Preferred diacids include isophthalic and terephthalic acids. As a branching agent, polyacids such as trimellitic anhydride, pyromellitic dianhydride, and 1,3,5-benzenetricarboxylic acid. In this context, it should be understood that the use of the corresponding anhydrides, esters, and acid chlorides of such diacids could be similarly utilized. Further, when referring to "residues" of such compounds, it should be understood that the residue is the repeat unit which remains after the polycondensation reaction to form the corresponding polyester. As starting materials, the diesters are the most preferred form. In this regard, the most preferred diacid residue starting materials include dimethyl terephthalate, dimethyl isophthalate, and dimethyl-1,4-cyclohexanedicarboxylate. Although the methyl esters are preferred, the reactions could also be carried out using higher alkyl esters such as ethyl, propyl, butyl, etc. In addition, aromatic esters such as phenyl, could also be used. The diacid comonomer may constitute from 1 to 100 mole % of the total acid component, not including the sulfomonomer component.

The difunctional sulfomonomer component may be a dicarboxylic acid or ester thereof containing a metal sulfonate group (—SO$_3$M) or a glycol containing a metal sulfonate group or a hydroxy acid containing a metal sulfonate group. The cation of the sulfonate salt may be a metal ion such as Li$^+$, Na$^+$, K$^+$, Mg$^{++}$, Ca$^{++}$, Ni$^{++}$, Fe$^{++}$, Fe$^{+++}$, and the like. Alternatively, the sulfonate salt may be non-metallic and may be a nitrogenous base as described in U.S. Pat. No. 4,304,901, incorporated herein by reference. A nitrogen based cation will be derived from nitrogen-containing bases, which may be aliphatic, cycloaliphatic, or aromatic compounds that have ionization constants in water at 25° C. of 10$^{-5}$ to 10$^{-8}$. Examples of such nitrogen containing bases include ammonia, pyridine, morpholine, and piperidine.

It is known that the choice of cation will influence the water-dispersibility of the resulting polymer. Monovalent alkali metal ions yield polyesters that are less readily dissipated by cold water and more readily dissipated by hot water, while divalent and trivalent metal ions typically result in polyesters that are not dissipated by cold water, but may be to some degree in hot water. Depending on the end-use application of the polymer, either of the different sets of properties may be desirable.

It is possible to prepare the polyester using, for example, a sodium sulfonate salt and then by ion-exchange methods replace the sodium with a different ion, such as zinc, when the polymer is in the dispersed form. This type of ion exchange procedure is generally superior to preparing the polymer with divalent and trivalent salts insofar as the sodium salts are usually more soluble in the polymer reactant melt-phase. (See, for example, U.S. Pat. Nos. 4,304,901 and 4,940,744, incorporated herein by reference.) Also, the ion-exchange procedure is usually necessary to obtain the nitrogenous counterions, since the amine salts tend to be unstable at typical melt processing conditions. Advantageous difunctional sulfomonomers are those where the sulfonate salt group is attached to an aromatic acid nucleus, such as benzene, naphthalene, diphenyl, oxydiphenyl, sulfonyldiphenyl, or methylenediphenyl. Preferably, sulfophthalic acid, sulfoterephthalic acid, sulfoisophthalic acid, 4-sulfonaphthalene-2,7-dicarboxylic acid, and their esters are utilized, as described in U.S. Pat. No. 3,779,993, incorporated herein by reference.

Particularly preferred is 5-sodiosulfoisophthalic acid, or esters therof.

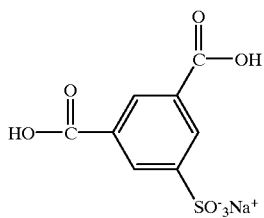

Optionally, 0 to about 50 mole percent, based on total carboxyl and hydroxyl equivalents, of component (d), a hydroxycarboxylic acid, may be utilized. These hydroxycarboxylic acids include aromatic, cycloaliphatic, or aliphatic and generally contain 2–20 carbon atoms, one —$CH_2OH$ group and one —COOH or —COOR group, wherein R is a $C_1$—$C_6$ alkyl group.

The glycol component includes aliphatic, alicyclic, and aralkyl glycols. Examples of such glycols include ethylene glycol; propylene glycol; 1,3-propanediol; 2,4-dimethyl-2-ethylhexane-1,3-diol; 2,2-dimethyl-1,3-propanediol; 2-ethyl-2-butyl-1,3-propanediol; 2-ethyl-2-isobutyl-1,3-10 propanediol; 1,3-butanediol; 1,4-butanediol; 1,5-pentanediol; 1,6-hexanediol;

2,2,4-trimethyl-1,6-hexanediol; thiodiethanol; 1,2-cyclohexanedimethanol; 1,3-cyclohexanedimethanol; 1,4-cyclohexanedimethanol; 2,2,4,4-tetramethyl-1,3-cyclobutanediol; and p-xylylenediol. In addition, poly (ethylene glycols) of low, medium and high molecular weights are particularly suitable and often preferred, since they impart a secondary measure of hydrophilicity to the resulting polymer. Preferred examples of low molecular weight poly(ethylene glycols) include; diethylene glycol, triethylene glycol, and tetraethylene glycol, with diethylene glycol, triethylene glycol being preferred. Examples of medium and relatively high molecular weight poly(ethylene glycols) of component (e) include the commercially available materials sold by Union Carbide under the mark CARBOWAX®. These medium to relatively high molecular weight poly(ethylene glycols) normally have molecular weights ranging from about 300 to 20,000, with 500 to 2000 being preferred. As branching agents, monomers such as trimethylol propane, trimethylol ethane, pentaerythritol, and glycerol could be utilized.

The molecular weight and the mole percent of poly (ethylene glycol) are inversely proportional to each other. In other words, as molecular weight is increased, the mole percent of poly(ethylene glycol) will be decreased. As an illustration, diethylene and triethylene glycols may constitute up to 100 mole percent of the total glycol, while a poly(ethylene glycol) having a molecular weight of 10,000 would typically be used at a level of less than one mole percent of total glycol.

Further, certain glycols may be formed in situ, due to side reactions that may be controlled by varying the process conditions. One preferred example of this is the formation of varying proportions of diethylene, triethylene, and tetraethylene glycols from ethylene glycol due to an acid-catalyzed dehydration, which occurs readily when a buffer is not added to raise (i.e., less acidic) the pH of the reaction mixture. (See U.S. Pat. No. 5,290,631, incorporated herein by reference.)

To obtain the polymers of this invention, the difunctional sulfomonomer is preferably added directly to the reaction mixture from which the polymer is made. Other processes which can be utilized include those methods taught in U.S. Pat. Nos. 3,018,272; 3,075,952; and 3,033,822; incorporated herein by reference. These references disclose interchange reactions as well as polymerization of build-up processes. Preferably, the crystalline water-dispersible polyesters according to this invention are prepared in a two-stage process, comprising an esterification (or ester-interchange) step and a polycondensation step. The ester-interchange or esterification step is preferably conducted under an inert atmosphere at a temperature of 150° to 250° C. for 0.5 to 8 hours, more preferably from 180° to 230° C. for 1 to 4 hours. The glycols, depending on their reactivities and the specific experimental conditions employed, are preferably used in molar excesses of 1.05 to 2.5 per total moles of acid-functional monomers. The second stage, referred to as polycondensation, is preferably conducted under reduced pressure at a temperature of 230° to 350° C., more preferably 240° to 300° C., and most preferably 250° to 285° C. for 0.1 to 6 hours, preferably 0.25 to 2 hours. Stirring or appropriate conditions are used in both stages to ensure adequate heat transfer and surface renewal of the reaction mixture. The reactions of both stages are facilitated by appropriate catalysts known in the art and taught, for example, in U.S. Pat. Nos. 3,018,272; 3,075,952; and 3,033,822, incorporated herein by reference. Suitable catalysts include alkoxy titanium compounds, alkali metal hydroxides and alcoholates, salts of organic carboxylic acids, alkyl tin compounds and metal oxides. For example, the catalysts may be selected from titanium (IV) isopropoxide, zinc (II) acetate, tetrabutyl titanate (IV), manganese (II) acetate, dibutyl tin (IV) dilaurate, stannous (II) octoate, antimony (III) oxide, and germanium (IV) dioxide.

Pigments and fillers are added to help circumvent the problem of the film blocking on the roll during storage and to lower the cost. Examples of suitable pigments and fillers include: calcium carbonate, titanium dioxide (both rutile and anastase grades), barium sulfate, calcium sulfate, talc, mica, silica and silicates, clays, magnesium oxide, magnesium carbonate, barium carbonate, lime, aluminum hydrates, zinc sulfide, and zinc oxide. At least about 10 weight percent of pigment or filler is necessary to prevent blocking of the film, while greater than 75% results in films having poor tensile strength or dispersibility. A preferred range is 10 to 45 weight percent with 20 to 40 weight percent being most preferred.

Colored pigments and fillers are may also be used and include inorganic compounds based on chromium, molybdenum, iron, cadmium, nickel, strontium, and lead as is well-known in the coatings art. Carbon black may also be used to obtain a black film. Organic compounds are also useful as dyes, pigments, and lakes to impart color and hiding to the finished film.

Waxes are also a component of the compositions of the present invention. We have found that polar waxes are more compatible with sulfopolyesters than non-polar waxes. Waxes useful herein are thus preferably polar in nature. Polar waxes are those which contain at least one polar functional group such as hydroxyl, amide, sulfone, phosphate, sulfonamide, urethane, carboxylate, amine and carbonate. The concentration of the functional group is present in an amount greater than about $2 \times 10^{-3}$ equivalents per gram and preferably greater than $3.5 \times 10^{-3}$ equivalents per gram. The molecular weight of waxes ranges from about 200 g/mole to about 1000 g/mole. Examples of preferred waxes include 12-hydroxysteramide, N-2(-hydroxy ethyl 12-hydroxy stearamide and N,N ethylene bis 12-hydroxyl stearamide (PARICIN 220 and PARICIN 285 respectively from CasChem, Bayonne, N.J.), stearamide (KEMEAMIDE S is from Witco, Memphis, Tenn.), glycerin monostearate, sorbitin monostearate, and 12-hydroxyl stearic acid. Also useful alone or in combination with the above are less polar waxes such as N,N-ethylene-bis stearmide (KEMAMIDE W40 from Witco), linear aliphatic long chain alcohol's (UNILIN 425 from Petrolite, Tulsa, Okla.), hydrogenated caster oil (castor wax), oxidized synthetic waxes (PETROLITE E-1040). The amount of wax is chosen as desired given the amount of pigment or filler and the inherent properties of the sulfopolyester component. In a preferred embodiment, the wax is present in an amount of about 5–25 weight percent, based on the total weight of the composition.

Other additives and modifiers can be incorporated as desired and include stabilizers, surfactants, plasticizers, lubricants, diluents, oils, antistatic agents, UV absorbers, other polymers, and catalysts.

The sulfopolyester and pigment may be combined in a mixing operation or may be manufactured in-situ by synthesizing the polymer, followed by post-addition of the pigments and fillers. Elevated temperatures in the 100–275° C. range are most useful with sufficient agitation provided, for example, by a turbine-blade, cowles, or sigma-blade mixer.

Melt Processing of Film

Film may be extruded into a single layer or multilayer structure by casting film, polishing sheet, blowing film, extrusion coating a layer, extruding into a profile or tube. Calendared sheet is also possible. Multilayer structures may be produced with other water soluble materials or non-water soluble materials depending on the performance requirements. Extrusion into monfilament or multifilament fibers are also within the scope of this invention.

In a cast film process, the polyester resin is first heated to a molten state and then extruded through a wide slot or coat hanger die. The sheet-like extrudate is rapidly cooled or quenched to form a cast sheet by contacting and traveling partially around a polished, revolving casting drum. Alternatively, a film could be blown in a conventional blown film process utilizing an annular shaped die.

The extruded film may be directly coating onto substrates including paper, fiber, cloth, fabric, foil, or polymer. It is also possible to laminate the extruded film onto similar substrates with an extrudable adhesive. Yet another variant is to employ heat and pressure to manufacture the extrusion laminate. Alternatively, it often desired to cast the polymer film or sheet onto a release paper for subsequent conversion into an end-use article of manufacture.

Although not preferred, the films of this invention could be cast from water, organic solvents, or mixtures of water and organic solvents.

EXAMPLES

Example 1 —Water-Dispersible Film 80 grams of Eastman AQ 14000, 10 grams of Eastman AQ 55S, and 0.2 grams of IRGANOX™ 1010 were mixed at 220° C. using a laboratory stirrer until a homogenous melt was obtained.

7 grams of fine particle size $CaCO_3$ and 3 grams of rutile $TiO_2$ were sifted into the melt and stirred until homogeneous. The product was recovered onto release paper.

Example 2 —Melt Extrusion of Formulation

A formulation was made containing 50 wt % $CaCO_3$ that was melt processed into film. A 1" screw diameter, 24:I L/D Killon extruder was run at 108 RPM. The barrel temperatures were set at: 85° C. (zone 1), 205° C. (zone 2), and 210° C. (zone 3) with the die temperature set point at 200° C. and a melt temperature of 205° C. The extrudate was discharged onto a casting roll that was temperature controlled at 45° F. with recirculating chilled water to produce a 3 mil film that was about 6 inches wide.

Example 3

Eighty pounds of 55% AQ14,000 resin (Eastman Chemical Company), 27% $CaCO_3$, 3% $TiO_2$, 5% stearic acid, and 10% AQ 55 resin (Eastman Chemical Company) was produced in a pilot plant reactor and chopped. This base was cryogenically ground and tumble blended with $CaCO_3$ to bring the total loading level to 35%. It was then compounded on a twin screw extruder with three loadings of filler being produced: 35% $CaCO_3$, 50% $CaCO_3$, and 35% $CaCO_3$+15% talc. Compounding temperatures of 85° C. (Zone 1) and 185° C. (Zone 2) were used. This material did not have enough melt strength to air pelletize. Compounded material was caught in pans, cooled with liquid nitrogen, and ground up.

Ice water strand cooling followed by drying was then attempted on the three formulas in order to improve pelletization. The formula containing only 35% filler became tacky upon returning to room temperature. The two formulas containing 50% filler were sucessfully ice water pelletized.

All three of the formulas were extruded into thin film using a 1" Killion extruder with a film die. The higher loading levels of fillers produced films which appeared to have moisture related effects (lacing) and also experienced some die build up. The 35% filler loading level appeared to be the best of these three samples.

An additional extrusion trial of the above materials was conducted with all of the materials being predried at 85° F. in desiccant hopper dryers at −40° F. dew point. The 50% filled formulas had some appearance of water in the extrudate. Thicknesses of the films ranged from 0.0005 inches to 0.010 inches.

Example 4

A second base formula was produced on a pilot scale reactor: 45% AQ 14,000 resin, 17% AQ 55 resin, 35%

CaCO₃, and 3% TiO₂. This base was compounded and pelletized using a 30 mm twin screw extruder. In order to prevent sticking of the material in the feed section of the extruder, water was run into the feed section of the core of the extruder screw. The first two zones of the extruder, 1 and 1a, were run without any heat. The remaining extruder barrel temperatures were Zone 1 b: 45° C., Zone 2: 106° C., Zone 3: 170° C., Zone 4: 160° C., Zone 5: 150° C. A belt conveyer was placed under the die with air jets pointed toward the end of the belt to free the sticking strands from the belt. The strands were pulled through an empty water bath to allow additional cooling time in the air. The strand cutter was placed about 12 feet beyond the bath support system to allow for additional cooling time. Three formulas were compounded from the base material: 1. neat (no additional materials), 2. base+5% stearic acid, 3. base+5% paracin.

The neat formula was extruded into film using a 1 inch Killion extruder with a Barrel Zone 1 temperature of 180° C., Zone 2 temperature of 220° C., and Zone 3 temperature of 220° C. and a pressure of 300 psi, at 78 rpm's, 4 amps, casting roll temperature of 40° F. and roll speed of 46 ft/min. The material did not feed well and was starve and pressure fed into the film extruder hopper. This film exhibited some moisture related lacing (holes). The film stuck to itself on the roll and did not unwind. Barrel Zone 1 was reduced to 85° C. The sample containing 5% stearic acid was then entruded. This film extruded well and would unwind off of the roll. There was some plating out of the additive onto the casting roll. The extrusion conditions were held constant and the 5% paracin formula was then extruded. This film extruded well also and did not exhibit any tackiness either. The film unrolled off of the roll well. These two films were extruded May 19, 1998 and are still intact and nontacky on Oct. 5, 1999. Samples of the stearic acid and paracin additive formulas were extruded in thicknesses from 0.0005 mils to 20 mils.

Physical properties of the films of these two formulas are listed in the attached table.

Water vapor transmission rates were measured on the two films. The Eastman water soluble film containing stearic acid had WVTR's of 202 and 293 g mils.m2 day. The WVTR's of the paracin containing film were 408 and 451 g mils/m2 day. All films were tested at 23° C. and 50% relative humidity using method ASTM E 96.

Higher CaCO₃ loading levels could successfully be produced into film by pulling a vent on the compounding extruder and subsequent storage of pellets in a dry environment such as metallized packaging. Additional technology exists for successfully producing high loading levels of CaCO₃ films in both polyolefins and polyesters.

Films A and B were composed of a base material of 45% AQ 14,000 resin, 17% AQ 55 resin, 35% CaCO₃, and 3% TiO₂ produced in the reactor. Film A was compounded with 5% Paracin. Film B was compounded with 5% stearic acid.

| Test Method | Units | Film A | Film B |
| --- | --- | --- | --- |
| ASTM D 1922 MD | | | |
| Thickness | mm | 0.061 | 0.099 |
| Tear Strength | g | 6 | 18 |
| Tear Strength | g/mm | 98.36 | 181.8 |
| ASTM D 882 MD | | | |
| Speed | 508.00 mm/min | | |
| Temp | 23° C. | | |
| Tensile Strength @ Yield | MPA | 2.8 | 2.7 |
| Std Dev TS YI | % | 0.16 | 0.13 |
| Tensile Strength @ Break M | Mpa | 0.9 | 0.7 |
| Std Dev TS BR | Mpa | 0.14 | 0.1 |
| Elongation @ Yield MD | % | 34.9 | 41 |
| Std Dev Elong BR | % | 7.87 | 9.47 |
| Elong @ Break MD | % | 501 | 555 |
| Std Dev Elong YI | % | 64 | 60 |
| ASTM D882 MD | | | |
| Speed 24.5 mm/min | | | |
| Temp | 23 deg C | | |
| Secant 1% | | | |
| Tan Modulus | Mpa | 85.3 | 71.1 |
| Std Dev Tan Mod | % | 12 | 11 |
| Secant Modulus | Mpa | 61.6 | 48 |
| Std Dev Sec Mod | % | 10.6 | 9.5 |

We claim:

1. A non-blocking film or fiber comprising a water-dispersible polymer composition comprising:
   (I) the sulfopolyester comprised of
      (i) monomer residues of at least one dicarboxylic acid; and
      (ii) up to about 75 monomer residues of at least one diol wherein said diol is other than a poly(alkylene glycol); and
      (iii) about 4 to 25 mole percent, based on the total of all acid and hydroxy equivalents, of monomer residues of at least one difunctional sulfomonomer containing at least one sulfonate group bonded to an aromatic ring, wherein the functional groups are hydroxy or carboxyl; and optionally
      (iv) monomer residues of at least one poly(alkylene glycol) having the formula —(OCH₂CH₂)$_n$— wherein n is 20 about 500, provided that the mole percent of such residues is inversely proportional to the value of n;
   (II) about 10 to 75 weight percent of a pigment or filler; and (III) a wax.

2. A water-dispersible polymer composition comprising:
   (I) a sulfopolyester component comprised of
      (a) a water-dispersible sulfopolyester having a Tg of ≦20° C. comprised of residues of
         (i) at least one difunctional dicarboxylic acid;
         (ii) at least one difunctional glycol containing two —CH₂OH groups of which at least 15 mole percent is a poly(ethylene glycol) having the formula

         H—(—OCH₂—CH₂—)$_n$—OH wherein n is an integer in the range of 2 to about 20;
         (iii) in an amount to provide said water dispersible characteristic of said polymer of at least one difunctional sulfomonomer containing at least one metal sulfonate group to an aromatic nucleus wherein the functional groups are hydroxy or carboxy; and
         (iv) up to about 50 mole percent of a difunctional hydroxy-carboxylic acid having one —C(R)₂—OH group, wherein R is H or a C₁–C₄ alkyl group; and (b) a water-dispersible branched polyester composition comprised of residues of:

(I) at least one difunctional dicarboxylic acid which is not a sulfomonomer;

(II) about 2 to 30 mol percent, based on the total of all acid, hydroxyl and amino equivalence, of residues of at least one difunctional sulfomonomer containing at least one sulfonate group bonded to an aromatic ring wherein the functional groups are hydroxyl, carboxyl, or amino;

(III) at least one diol or a mixture of a diol and a diamine comprising:

(A) about 0.1 to 85 mole percent, based on the total mol percent of diol moieties or diol and diamine moieties, of a diol or diamine having the formula $H(-OCH_2CH_2-)_nOH$ and $HRN(-(CH_2CH_2O))_n NHR$ wherein n is 2 to about 20 and R is hydrogen or $C_1$-$C_6$ alkyl provided that the mol percent of such moieties is inversely proportional to the value of n;

(B) about 0.1 to 15 mol percent, based on the total mol percent of diol moieties or diol and diamine moieties, of moieties of a poly(ethylene glycol) having the formula $H(-OCH_2CH_2-)_nOH$ wherein n is 2 to about 500, provided that the mol percent of such moieties is inversely proportional to the value of n; and (C) 0 to greater than about 99 mole percent of the diol component or diol and diamine mixture being selected from the group consisting of a glycol and a mixture of glycol and diamine having two —NRH groups, the glycol containing two —C($R^1$)$_2$—OH groups wherein $R^1$ is a hydrogen atom, an alkyl of 1 to 5 carbon atoms, or an aryl group of 6 to 10 carbon atoms;

(IV) 0 to about 40 mol % of a difunctional monomer reactant selected from the group consisting of hydroxycarboxylic acids having one —C(R—)$_2$—OH group, aminocarboxylic acids having one —NRH group, aminoalkanols having one —C(R—)$_2$OH group and one —NRH group and mixtures of said difunctional reactants wherein R is hydrogen or an alkyl group of 1 to 6 carbon atoms; and (V) about 0.1 to 40 mole % of a multifunctional or branch-inducing reactant containing at least three functional groups selected from hydroxyl, carboxyl, amino, and mixtures thereof;

said branched polyester comprised of substantially equal mol proportions of acid equivalents (100 mol %) and diol or diol and diamine equivalents (100 mol %) wherein at least 20 weight percent of the groups linking the moieties of the monomeric units are ester linkages and wherein the inherent viscosity is at least 0.1 dL/g measured in a 60/40 parts by weight solution of phenol/tetrachloroethane at 25° C. and at a concentration of about 0.25 g of polymer in 100 ml of the solvent, the glass transition temperature $T_g$ is no greater than 20° C., and the ring and ball softening point is at least 70° C.;

(II) about 10 to 75 weight percent of a pigment or filler; and (III) a wax.

3. The composition of claim 2, wherein the branched sulfopolyester is comprised of:

(i) a dicarboxylic acid;

(ii) 2 to 15 mole percent of sodioisophthalic acid residues;

(iii) poly(ethylene glycol);

(iv) up to 50 mole percent of a diol which is other than poly(ethylene glycol);

(v) 0.1 to 20 mole percent of at least one trifunctional hydroxy compound; wherein said sulfopolyester has a $T_g$ of $\leq 20°$ C.

4. The composition of claim 2, wherein the (a) is comprised of:

(i) an aromatic diacid component comprised of up to 50 mole percent of an aliphatic or cycloaliphatic diacid;

(ii) 5 to 25 mole percent of sodioisophthalic acid;

(iii) a diol;

(iv) up to 75 mole percent of poly(ethylene glycol); wherein said sulfopolyester has a $T_g$ of about 25 to 125° C.

5. The composition of claim 2, wherein the filler or pigment is present in a range of 10 to 45 weight percent.

6. The composition of claim 2, wherein the filler or pigment is present in a range of about 20 to 40 weight percent.

7. The composition of claim 2, wherein the filler or pigment is selected from the group consisting of calcium carbonate, titanium dioxide, barium sulfate, calcium sulfate, talc, mica, silica and silicates, clays, magnesium oxide, magnesium carbonate, barium carbonate, lime, aluminum hydrates, zinc sulfide, and zinc oxide.

8. The composition of claim 2, wherein the filler or pigment is selected from the group consisting of calcium carbonate, titanium dioxide, barium sulfate, calcium sulfate, talc, mica, silica and silicates, clays, magnesium oxide, magnesium carbonate, barium carbonate, lime, aluminum hydrates, zinc sulfide, and zinc oxide.

9. The composition of claim 8, wherein said wax is selected from the group consisting of 12-hydroxysteramide, N-2(-hydroxy ethyl 12-hydroxy stearamide, N,N-ethylene bis 12-hydroxyl stearamide, stearamide, glycerin monostearate, sorbitin monostearate, 12-hydroxyl stearic acid, N,N-ethylene-bis stearmide, linear aliphatic long chain alcohols, hydrogenated caster oil, and oxidized synthetic waxes.

10. The composition of claim 8, wherein said wax is selected from the group consisting of 12-hydroxysteramide, N-2(-hydroxy ethyl 12-hydroxy stearamide, N,N-ethylene bis 12-hydroxyl stearamide, stearamide, glycerin monostearate, sorbitin monostearate, 12-hydroxyl stearic acid, N,N-ethylene-bis stearmide, linear aliphatic long chain alcohols, hydrogenated caster oil, and oxidized synthetic waxes.

11. An article comprised of the composition of claim 2.

12. A film comprised of the composition of claim 2.

* * * * *